(12) United States Patent
Torpey

(10) Patent No.: US 9,846,549 B2
(45) Date of Patent: *Dec. 19, 2017

(54) METHOD AND SYSTEM FOR DATA ARCHIVING

(71) Applicant: Viacom International Inc., New York, NY (US)

(72) Inventor: Richard Torpey, New York, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,518

(22) Filed: Dec. 20, 2016

(65) Prior Publication Data

US 2017/0102891 A1 Apr. 13, 2017

Related U.S. Application Data

(63) Continuation of application No. 13/914,951, filed on Jun. 11, 2013, now Pat. No. 9,557,920.

(51) Int. Cl.
*G06F 15/167* (2006.01)
*G06F 3/06* (2006.01)

(52) U.S. Cl.
CPC ........... *G06F 3/0619* (2013.01); *G06F 3/065* (2013.01); *G06F 3/067* (2013.01)

(58) Field of Classification Search
USPC ................................................. 709/203, 213
See application file for complete search history.

(56) References Cited

U.S. PATENT DOCUMENTS

| | | | | |
|---|---|---|---|---|
| 5,828,902 A | * | 10/1998 | Tanaka .................. | G06F 3/0613 710/39 |
| 6,473,815 B1 | * | 10/2002 | Lu ........................ | H04L 47/6215 370/402 |
| 8,219,684 B1 | * | 7/2012 | Dean ..................... | G06F 9/5027 709/203 |
| 8,423,662 B1 | * | 4/2013 | Weihl ..................... | G06F 9/505 709/238 |
| 2012/0303869 A1 | * | 11/2012 | Benhase ............. | G06F 12/0868 711/103 |

* cited by examiner

*Primary Examiner* — Duyen Doan
(74) *Attorney, Agent, or Firm* — Fay Kaplun & Marcin, LLP

(57) ABSTRACT

A data server, method and computer readable storage medium for receiving a current request relating to a data archive, determining a number of queued requests relating to the data archive present in a request queue, determining a waiting time for the current request based on the number of queued requests and adding the current request to the request queue after the waiting time has elapsed.

20 Claims, 2 Drawing Sheets

METHOD AND SYSTEM FOR DATA ARCHIVING

The present application is a Continuation Application of U.S. Non-Provisional patent application Ser. No. 13/914,951 filed on Jun. 11, 2013, now U.S. Pat. No. 9,557,920. The entire disclosure of the above-identified patent is considered as being part of the disclosure of the accompanying application and hereby expressly incorporated by reference herein.

BACKGROUND

Multimedia content providers may typically need to transfer large amounts of data to and from storage backups. Requests for data to be transferred in this manner may be placed into a queue and taken from the queue for processing based on the priority of the request. However, processing of requests may be performed more slowly when there are a large number of requests existing within the queue. Therefore, it may be desirable to limit the size of the queue.

SUMMARY OF THE INVENTION

A method for receiving a current request relating to a data archive, determining a number of queued requests relating to the data archive present in a request queue, determining a waiting time for the current request based on the number of queued requests and adding the current request to the request queue after the waiting time has elapsed.

A data server having a processor and a memory storing a set of instructions that are executable by the processor to cause the processor to perform operations. The operations include receiving a current request relating to a data archive stored within the memory, determining a number of queued requests relating to the data archive present in a request queue, determining a waiting time for the current request based on the number of queued requests and adding the current request to the request queue after the waiting time has elapsed.

A non-transitory computer-readable storage medium storing a set of instructions that is executable by a processor, the set of instructions, when executed by the processor, causing the processor to perform operations. The operations include receiving a current request relating to a data archive, determining a number of queued requests relating to the data archive present in a request queue, determining a waiting time for the current request based on the number of queued requests and adding the current request to the request queue after the waiting time has elapsed.

DETAILED DESCRIPTION

Figure 1:
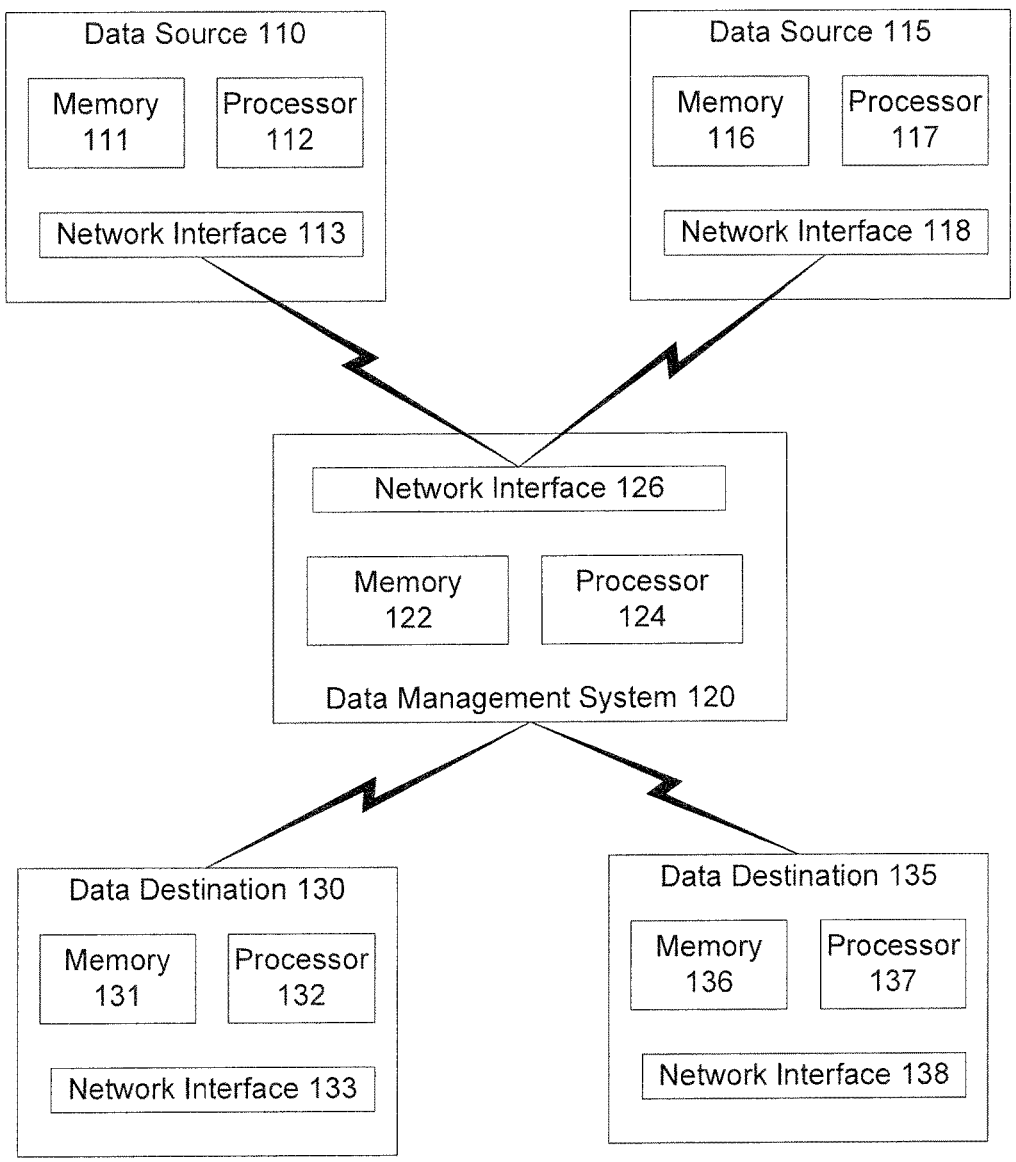
FIG. 1 shows a system for archiving data, such as multimedia content, according to an exemplary embodiment.

The exemplary embodiments may be further understood with reference to the following description and the related appended drawings, wherein like elements are provided with the same reference numerals. Specifically, the exemplary embodiments relate to methods and systems for improving the throughput of data that is being transferred to and from archives. Throughout this disclosure, specific reference will be made to multimedia content providers as an entity which performs the archiving operations being discussed herein; however, those of skill in the art will understand that this is only one example, and that the exemplary embodiments described herein may be equally applicable to any other entity that may perform data archiving.

Providers of multimedia content, such as television broadcasters, may generate large amounts of data (e.g., video recordings, audio recordings, collections of still images, etc.). Once generated, this data may typically be stored in data warehouses of archives for subsequent use. This archiving may involve both storage steps and retrieval steps.

At any given time within a data archive maintained by a multimedia content provider, there may be both storage requests (e.g., archiving of new content, migration of content from one storage location to another, etc.) and retrieval requests (e.g., retrieval of content for television broadcast, streaming to a user over a data network, etc.) taking place. Additionally, there may be queues of requests waiting to be processed. Once added to a queue, requests may be processed in an order according to a set of rules that is in effect for a given archive; typically, this may entail sorting a queue in order of priority and processing requests in order of their priority, but this ordering is only exemplary.

However, the performance of an archiving system may slow when there are a large amount of requests in a queue; in other words, for a given archiving system, the larger a queue is, the slower it is processed. The slowing effect may typically be proportional to the square of the number of the requests in the queue. Further, once a request has been added to a queue, it may remain queued until it has been processed. This may be especially problematic in the case of low-priority requests, such as requests involving the migration of a large amount of stored data from one archive to another, which, once added to a queue, may wait in the queue for a long period of time, slowing down the performance of higher-priority requests due to the longer queue, though it is unlikely that they will be selected for processing from a large queue due to their low priority.

In order to remedy this decrease in performance, multimedia content providers may wish to delay the addition of low-priority requests into a queue that is already lengthy. This may entail the use of a threshold size; once a number of requests in the queue exceeds the threshold size, no more requests may be added to the queue. However, when this constraint is not in effect (i.e., when the number of requests in the queue does not exceed the threshold size), the rate at which requests may be added to the queue is not controlled; typically this may mean that requests are generated and added to the queue at a constant rate until the size reaches the threshold.

However, this rate may not be variable depending on the load on the system, or on how fast requests are being processed by the system; rather, addition of requests to the queue may only be stopped once the queue reaches a threshold, as noted above. Therefore, it may be typical for the size of a queue to reach the threshold, for requests to be processed slowly due to the existence of a lengthy queue until the size of the queue has decreased to below the threshold size, and for the size of the queue to quickly return to being above the threshold size because there is no modulation in the rate at which requests are added to the queue when its size is below the threshold. As will be described in further detail hereinafter, the exemplary embodiments may achieve improved throughput by varying the rate of addition of requests to a queue in an adaptive manner in order to ensure that a queue does not become bogged down with low-priority requests.

FIG. 1 schematically illustrates a data archiving system 100 according to an exemplary embodiment. The system 100 includes data sources 110 and 115. The nature of the data sources 110 and 115 may vary among differing embodiments, and depending on the nature of the data originating at the data source. For example data source 110 may be a data archive storing data that may need to be moved to another data archive, and data source 115 may be a location at which newly-created content was created. The data sources 110 and 115 may include, among other elements, memories 111 and 116, processors 112 and 117, and network interfaces 113 and 118.

The system 100 also includes a data management system 120. The data management system 120 may be a location to which data is being sent, e.g., a data archive. The data management system 120 may include, among other elements, a memory 122, a processor 124, and a network interface 126. The memory 122 may storage (e.g., a hard drive) in which an archive management application implementing the archiving process to be described herein is disposed (e.g., a hard drive within a server), short-term memory (e.g., a buffer) for storing queued requests as will be described in detail hereinafter, and active memory to be used by the processor 124 for executing tasks (e.g., RAM). The network interface 126 may enable the data management system 120 to communicate with data sources 110 and 115 via their network interfaces 113 and 118. For example, the network-interface 113 and the network interface 126 may both be connected to the Internet, and data may be transmitted therebetween via the Internet. Alternately, the network interface 113 and the network interface 126 may both be connected to a local-area network, and data may be transmitted via the local-area network.

The system 100 also includes data destinations 130 and 135. The data destinations 130 and 135 may include, among other elements, memories 131 and 136, processors 132 and 137, and network interfaces 133 and 138. The data destinations 130 and 135 may include, among other programming, data moving applications for performing the actual transmission of data among the various elements of the system 110. The memories 131 and 136 of data destinations 130 and 135 may include, for example, hard disk storage, tape storage, remote storage, distributed storage, etc. The network interfaces 133 and 138 may be communicatively coupled to the network interface 126 in the manners described above.

Those of skill in the art will understand that the system 100 illustrated in FIG. 1 is only exemplary. In other embodiments, there may be differing quantities of data sources, such as where data to be archived is being generated at multiple locations and stored at a central repository. Additionally, there may be multiple instances of the data management system 120, such as where an entity operating the system 100 desires redundant backups of data. Those of skill in the art will understand that the system 100 may also be interconnected with, or integrated with, a general-purpose computing network providing for the general computing needs, including but not limited to other types of data archiving, of a multimedia content provider or any other type of entity that may wish to avail itself of the archiving techniques presented by the exemplary embodiments.

Figure 2:
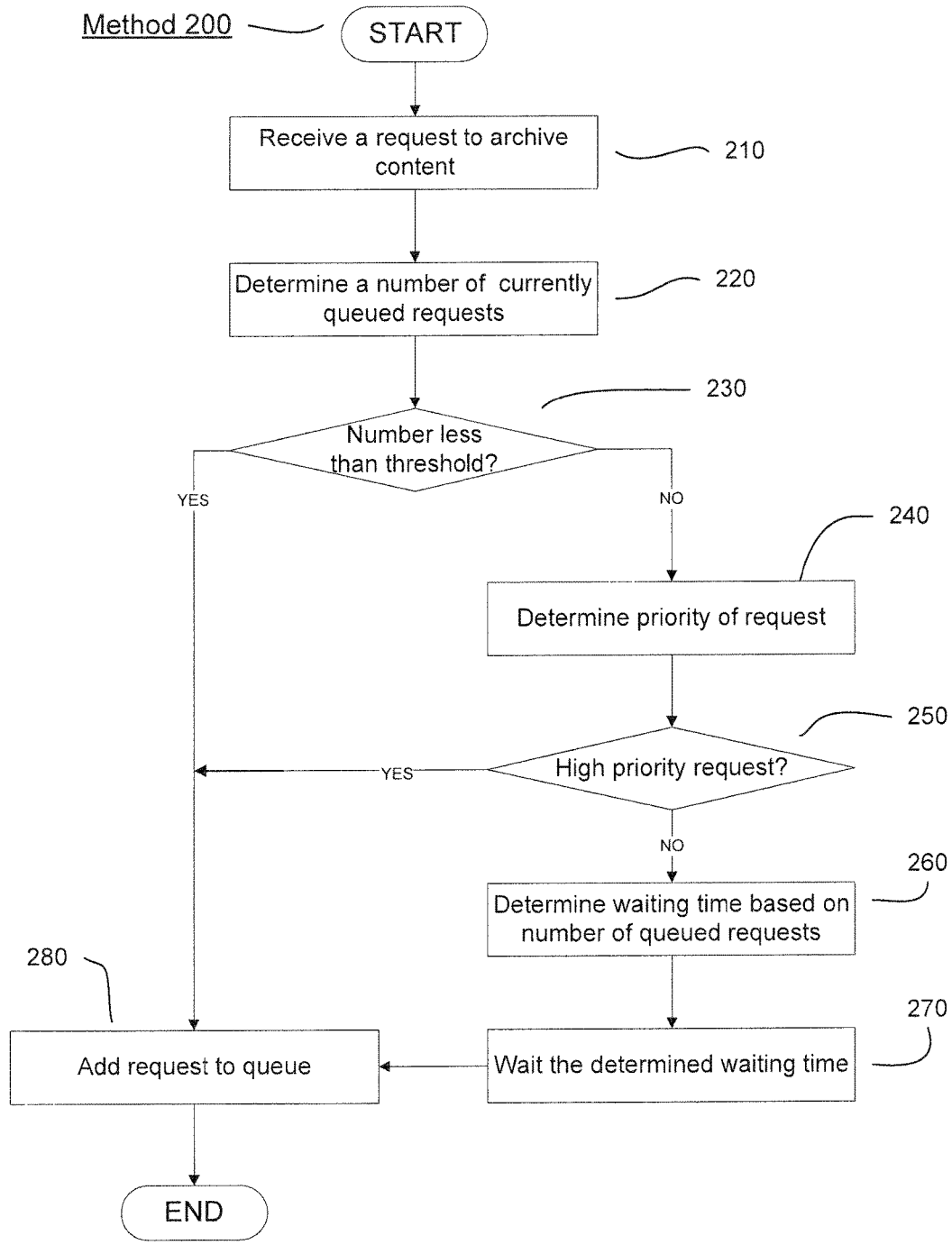
FIG. 2 shows a method to be applied by a system such as the system of FIG. 1 for archiving data, such as multimedia content, according to an exemplary embodiment.

FIG. 2 illustrates a data archiving method 200 according to an exemplary embodiment. The method 200 will be described with reference to the elements of the exemplary system 100 illustrated in FIG. 1, but those of skill in the art will understand that this description is only exemplary and that the method 200 may be practiced in various other systems without departing from the principles embodied by the exemplary method 200. The method 200 is described with general reference to requests; it will be apparent to those of skill in the art that requests being made in the method 200 may be requests to store content or requests to retrieve content, depending on the specific implementation and tasks being handled by a system such as the system 100.

In step 210, a request to archive content in the memory 124 is received by the data management system 120. The request may be user-initiated (e.g., by a user of data source 110 or data management system 120), initiated based on some automated trigger (e.g., if an amount of data stored in the memory 111 of the data source 110 has exceeded a threshold value), periodically at predetermined intervals (e.g., for routine backups), or based on any other type of event that may trigger a request to archive multimedia content or any other type of data. It will be apparent to those of skill in the art that while the method 200 is described with reference to a request to archive content, the broader principles of the method 200 may be equally applicable to any type of request relating to the data management system 120, e.g., requests to store data, requests to retrieve data, requests to copy data, requests to back up data, requests to delete data, or a request for any other type of operation that may be performed in the context of a data archive. In one exemplary embodiment, requests may include requests to archive content originating from one source and requests to retrieve content for airing originating from a different source.

In step 220, the data management system 120 determines a number of requests currently queued to be processed for one of the data destinations 130 and 135. This number will be used in two manners, as will be described below.

In step 230, the data management system 120 determines whether the number of requests currently queued exceeds a threshold value. This comparison may be performed so that if there are only a small number of requests in a current queue, new requests may be added without delay. In one exemplary embodiment, the threshold may be 100 requests. In another exemplary embodiment, the threshold may be configurable by a user of data management system 120. If the number of requests in the queue is less than the threshold value, the method proceeds to step 280, which will be described below. If the number of requests in the queue is greater than or equal to the threshold value, the method continues in step 240.

In step 240, the data management system 120 determines information relating to the priority of the request currently received and under consideration. This determination may be made so that high-priority requests, such as requests to retrieve content for broadcast, may be prioritized over low-priority requests, such as requests to migrate data from one archive to another, requests to copy data from disk to tape, requests to restore data to a remote storage, requests to synchronize with a remote archive, requests to age material out from disk to tape and delete disk instances, scheduled quality control tasks, and batch processing of transcoding, captioning, subtitling, etc. In step 250, the data management system 120 determines whether the request is a high-priority request or a low-priority request. This determination may be made by any method for determining the priority of a request that is known in the art; types of requests that are deemed high-priority and low-priority may be predetermined or user-configurable. If the current request is a high-priority request, the method proceeds to step 280, which will be described below. If the current request is a low-priority request, the method continues in step 260.

In step 260, a waiting time is determined for the current request. As noted above, when there are more entries in a request queue, a system processing the requests from the queue will experience a performance decrease. This performance penalty increases with the number of requests in the queue in proportion to the square of the number of queued requests. Therefore, the exemplary method provides for an adaptive delay that is proportional to the cube of the number of queued requests in order to allow the size of the queue to decrease through processing of requests currently in the queue without having large numbers of requests be added to the queue to compound the existing delay.

In one exemplary embodiment, the waiting time $T_w$ may be determined by the following formula:

$$T_w = \frac{N_{queued}^3}{G^2} + O$$

In this formula, $N_{queued}$ is the number of currently queued requests, and, as noted above, the waiting time is based on the cube of the number of currently queued requests. G is a gain value that is provided in order to enable the provided waiting times to be configured. In one exemplary embodiment, the gain value may be predetermined; in another it may be user-configurable. A gain value of 50 may slow down requests to a greater degree, a gain value of 150 may slow down requests to a lesser degree, and a gain value of 100 may provide an intermediate level of slowing. O is an offset value that is provided to enable further configuration. In one exemplary embodiment, the offset value may be predetermined; in another it may be user-configurable. In a typical embodiment, the offset value may be 1. In the exemplary formula described above, the resulting waiting time is provided in seconds. The waiting time may be considered a parameter that could be passed to the script that is externally processing the requests. In the exemplary embodiments, the script is incorporated into the management system.

It is noted that the above formula is only one exemplary formula for determining waiting times. There are a number of variations of the formula depending on various considerations such as the performance of the archive system. For example, a newer, faster archive system may permit larger queues before performance degradation occurs so the exemplary embodiments could permit more low priority requests to be submitted than would be desirable on a slower system.

In step 270, the data management system 120 waits for the waiting time that has been determined in step 260. In one exemplary embodiment, requests that are waiting in this manner may be stored in a buffer present within memory 122 of data management system 120. Following step 270, the method proceeds to step 280. In step 280, the request is added to the queue. Following step 280, the method 200 terminates.

The exemplary embodiments may provide an increase in throughput of data archiving operations performed by multimedia content providers. This increase in throughput may be on the order of 50% to 100% as compared with the approach described above that merely prohibits the addition of new requests to a queue that is currently above a size threshold. Additionally, the increased throughput may provide preferential treatment to high-priority requests, in addition to the standard use of preferential queuing, in the form of exemption from the requirement imposed on low-priority requests to have their addition to a large request queue delayed.

The above disclosure has described the exemplary embodiments with specific reference to archiving operations performed by a multimedia content provider. However, those of skill in the art will understand that the broader principles described herein may be equally applicable to any entity that operates a data archive and wishes to improve the performance of storage and retrieval operations involving such a data archive.

Those of skill in the art will understand that various embodiments may differ from the exemplary embodiments described above, without departing from the broader scope of this disclosure. Those of skill in the art will understand that the above-described exemplary embodiments may be implemented in any number of matters, including as a software module, as a combination of hardware and software, etc. For example, the exemplary method 200 may be embodied in a program stored in non-transitory storage media and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
at a data server:
receiving a first current request, the first current request for transferring data from a data source to a data archive;
determining whether a number of queued requests at the data archive present in a request queue of the data archive at a time when the first current request is received is greater than a predetermined threshold;
when the number of queued requests is less than the predetermined threshold, adding the first current request to the request queue; and
when the number of queued requests is greater than the predetermined threshold, preventing the first current request from being added to the request queue until a waiting time associated with the first current request has elapsed to dynamically vary when the first current request is added to the request queue.

2. The method of claim 1, further comprising:
determining the waiting time for the first current request based on the number of queued requests in the request queue.

3. The method of claim 1, wherein the threshold number is one of predetermined and configurable by a user.

4. The method of claim 3, wherein the threshold number is 100.

5. The method of claim 1, wherein the number of queued requests being greater than the threshold number is indicative of a decrease in performance of the data archive in servicing the request queue.

6. The method of claim 1, wherein, when the number of queued requests is greater than the predetermined threshold, the method further comprising:
determining a priority of the first current request; and
adding the first current request to the request queue when the priority of the first current request is a high priority.

7. The method of claim 1, wherein the waiting time is determined based on a cube of the number of queued requests.

8. The method of claim 7, wherein the waiting time is determined based on the number of queued requests, a gain value, and an offset value.

9. The method of claim 8, wherein the gain value and the offset value are one of predetermined and configurable by a user.

10. The method of claim 8, wherein the gain value is in the range of 50 to 150.

11. A data server, comprising:
   a processor; and
   a memory storing a set of instructions that are executable by the processor to cause the processor to perform operations comprising:
      receiving a first current request, the first current request for transferring data from a data source to a data archive;
      determining whether a number of queued requests at the data archive present in a request queue of the data archive at a time when the first current request is received is greater than a predetermined threshold;
      when the number of queued requests is less than the predetermined threshold, adding the first current request to the request queue;
      when the number of queued requests is greater than the predetermined threshold, preventing the first current request from being added to the request queue until a waiting time associated with the first current request has elapsed to dynamically vary when the first current request is added to the request queue.

12. The data server of claim 11, wherein the operations further comprise:
   determining the waiting time for the first current request based on the number of queued requests in the request queue.

13. The data server of claim 11, wherein the threshold number is one of predetermined and configurable by a user.

14. The data server of claim 13, wherein the threshold number is 100.

15. The data server of claim 11, wherein the number of queued requests being greater than the threshold number is indicative of a decrease in performance of the data archive in servicing the request queue.

16. The data server of claim 11, wherein, when the number of queued requests is greater than the predetermined threshold, the operations further comprising:
   determining a priority of the first current request; and
   adding the first current request to the request queue when the priority of the first current request is a high priority.

17. The data server of claim 11, wherein the waiting time is determined based on a cube of the number of queued requests.

18. The data server of claim 17, wherein the waiting time is determined based on the number of queued requests, a gain value, and an offset value.

19. The data server of claim 18, wherein the gain value and the offset value are one of predetermined and configurable by a user.

20. A non-transitory computer-readable storage medium of a data server storing a set of instructions that is executable by a processor, the set of instructions, when executed by the processor, causing the processor to perform operations comprising:
   receiving a first current request, the first current request for transferring data from a data source to a data archive;
   determining whether a number of queued requests at the data archive present in a request queue of the data archive at a time when the first current request is received is greater than a predetermined threshold;
   when the number of queued requests is less than the predetermined threshold, adding the first current request to the request queue; and
   when the number of queued requests is greater than the predetermined threshold, preventing the first current request from being added to the request queue until a waiting time associated with the first current request has elapsed to dynamically vary when the first current request is added to the request queue.

* * * * *